US009157638B2

(12) United States Patent
Ponziani et al.

(10) Patent No.: US 9,157,638 B2
(45) Date of Patent: Oct. 13, 2015

(54) ADAPTOR ASSEMBLY FOR REMOVABLE COMPONENTS

(75) Inventors: Robert Louis Ponziani, West Chester, OH (US); Donald Corsmeier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 13/362,332

(22) Filed: Jan. 31, 2012

(65) Prior Publication Data
US 2013/0195546 A1 Aug. 1, 2013

(51) Int. Cl.
F16D 1/00 (2006.01)
F23R 3/60 (2006.01)
F02C 7/266 (2006.01)

(52) U.S. Cl.
CPC . *F23R 3/60* (2013.01); *F02C 7/266* (2013.01); *Y10T 403/255* (2015.01); *Y10T 403/52* (2015.01); *Y10T 403/602* (2015.01)

(58) Field of Classification Search
CPC .................................. F02C 7/266; F23R 3/60
USPC ............. 403/34, 35, 36, 37, 38, 39, 262, 288, 403/327; 123/143 R, 169 CB; 60/39.827, 60/798, 799
See application file for complete search history.

(56) References Cited

U.S. PATENT DOCUMENTS

| 1,474,661 | A | * | 11/1923 | Berglof | 123/143 R |
| 2,602,293 | A | * | 7/1952 | Goddard | 60/39.821 |
| 2,651,298 | A | * | 9/1953 | Brinson et al. | 313/135 |
| 3,090,200 | A | * | 5/1963 | Barberis | 60/39.821 |
| 3,910,036 | A | * | 10/1975 | Irwin | 60/753 |
| 3,911,672 | A | * | 10/1975 | Irwin | 60/796 |
| 4,275,559 | A | * | 6/1981 | Blair | 60/39.827 |
| 4,815,276 | A | | 3/1989 | Hansel et al. | |
| 5,647,597 | A | * | 7/1997 | Grochowski | 277/551 |
| 5,658,086 | A | * | 8/1997 | Brokaw et al. | 403/327 |
| 6,074,118 | A | * | 6/2000 | Ferrari et al. | 403/31 |
| 6,298,667 | B1 | * | 10/2001 | Glynn et al. | 60/737 |
| 6,363,898 | B1 | * | 4/2002 | Ripma et al. | 123/169 R |
| 6,438,940 | B1 | * | 8/2002 | Vacek et al. | 60/204 |
| 6,442,929 | B1 | | 9/2002 | Kraft et al. | |
| 6,557,350 | B2 | * | 5/2003 | Farmer et al. | 60/776 |
| 6,715,279 | B2 | | 4/2004 | White | |
| 6,920,762 | B2 | | 7/2005 | Wells et al. | |
| 7,101,173 | B2 | * | 9/2006 | Hernandez et al. | 431/258 |
| 8,171,719 | B2 | * | 5/2012 | Ryan | 60/39.821 |

(Continued)

FOREIGN PATENT DOCUMENTS

CN 1490563 A 4/2004
GB 1129100 A 10/1968

OTHER PUBLICATIONS

International Search Report and Written Opinion issued in connection with corresponding PCT Application No. PCT/US2012/061821 dated Jan. 16, 2013.

(Continued)

*Primary Examiner* — Daniel P Stodola
*Assistant Examiner* — Matthew R McMahon
(74) *Attorney, Agent, or Firm* — General Electric Company; Pamela A. Kachur

(57) ABSTRACT

An assembly is provided with a housing, a guide sleeve, and a spring. The guide sleeve may be at least partially housed within the housing. The spring may be disposed to abut against the housing and the guide sleeve.

15 Claims, 4 Drawing Sheets

(56) References Cited

U.S. PATENT DOCUMENTS

| | | | |
|---|---|---|---|
| 8,181,440 B2* | 5/2012 | Sandelis | 60/39.821 |
| 8,479,490 B2* | 7/2013 | Zupanc et al. | 60/39.821 |
| 2007/0068166 A1* | 3/2007 | Gautier et al. | 60/752 |
| 2009/0064657 A1* | 3/2009 | Zupanc et al. | 60/39.821 |
| 2009/0178385 A1* | 7/2009 | Sandelis | 60/39.821 |
| 2009/0235635 A1 | 9/2009 | Ryan | |
| 2011/0113748 A1* | 5/2011 | Lains et al. | 60/39.827 |
| 2011/0120132 A1* | 5/2011 | Rudrapatna et al. | 60/752 |
| 2012/0227373 A1* | 9/2012 | Bunel et al. | 60/39.827 |

OTHER PUBLICATIONS

Unofficial English translation of Office Action issued in connection with corresponding CN Application No. 201280068792.5 on Apr. 23, 2015.

* cited by examiner

ADAPTOR ASSEMBLY FOR REMOVABLE COMPONENTS

STATEMENT REGARDING FEDERALLY SPONSORED RESEARCH OR DEVELOPMENT

This invention was made with support from the U.S. Government under contract FA8650-07-C-2802 awarded by the United States Air Force. Pursuant to this contract, the government may have certain rights in this invention.

BACKGROUND

The disclosed embodiments generally pertain to gas turbine engines, and particularly to adaptor assemblies for removing and installing removable components, as they are used in gas turbine engines.

SUMMARY

A first embodiment of the present invention provides an assembly that is provided with a housing, a guide sleeve, and a spring. The guide sleeve may be at least partially housed within the housing, and the spring may be disposed to abut against the housing and the guide sleeve.

Another embodiment of the present invention provides an assembly with a housing, a guide sleeve, a spring, and a retainer. The retainer may be housed within the housing, and the guide sleeve may be at least partially housed within the housing, and may further at least partially extend through the retainer. The spring may be disposed to abut against the housing and the guide sleeve.

Yet another embodiment of the present invention provides a housing, a guide sleeve, a spring, and a retainer. The retainer may be housed within the housing, and the guide sleeve may also be at least partially housed within the housing, and at least partially extend through the retainer. The spring may be at least partially housed within the guide sleeve, and may be disposed to bias the guide sleeve against the retainer.

Another aspect of the present invention provides a housing having a housing first end and an opposed housing second end, the housing having an opening therethrough extending through the housing first end and the housing second end. A guide sleeve may be provided with a guide sleeve first end and an opposed guide sleeve second end. The guide sleeve may have an opening therethrough extending through the guide sleeve first end and the guide sleeve second end. A spring may be provided where the spring may be at least partially housed within the guide sleeve and at least partially extends through the guide sleeve second end. The guide sleeve may be at least partially housed within the housing, and the guide sleeve first end may extend through the housing first end.

Other aspects of the present invention may provide a seal mounted to a guide sleeve.

BRIEF DESCRIPTION OF THE ILLUSTRATIONS

Embodiments of the invention are illustrated in the following illustrations.

DETAILED DESCRIPTION

A typical gas turbine engine generally possesses a forward end and an aft end with its several components following inline therebetween. An air inlet or intake is at a forward end of the engine and may have an integral particle separator incorporated therein. Moving toward the aft end, in order, the intake is followed by a compressor, a combustion chamber, a turbine, and a nozzle at the aft end of the engine. It will be readily apparent to those skilled in the art that additional components may also be included in the engine, such as, for example, low-pressure and high-pressure compressors, high-pressure and low-pressure turbines, and an external shaft. This, however, is not an exhaustive list. An engine also typically has an internal shaft axially disposed through a center longitudinal axis of the engine. The internal shaft is connected to both the turbine and the air compressor, such that the turbine provides a rotational input to the air compressor to drive the compressor blades. A typical gas turbine engine may also be considered to have an outer circumference, as they are typically cylindrical in shape.

As used herein, the terms "radial" or "radially" refer to a dimension extending between a central longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

Figure 1:
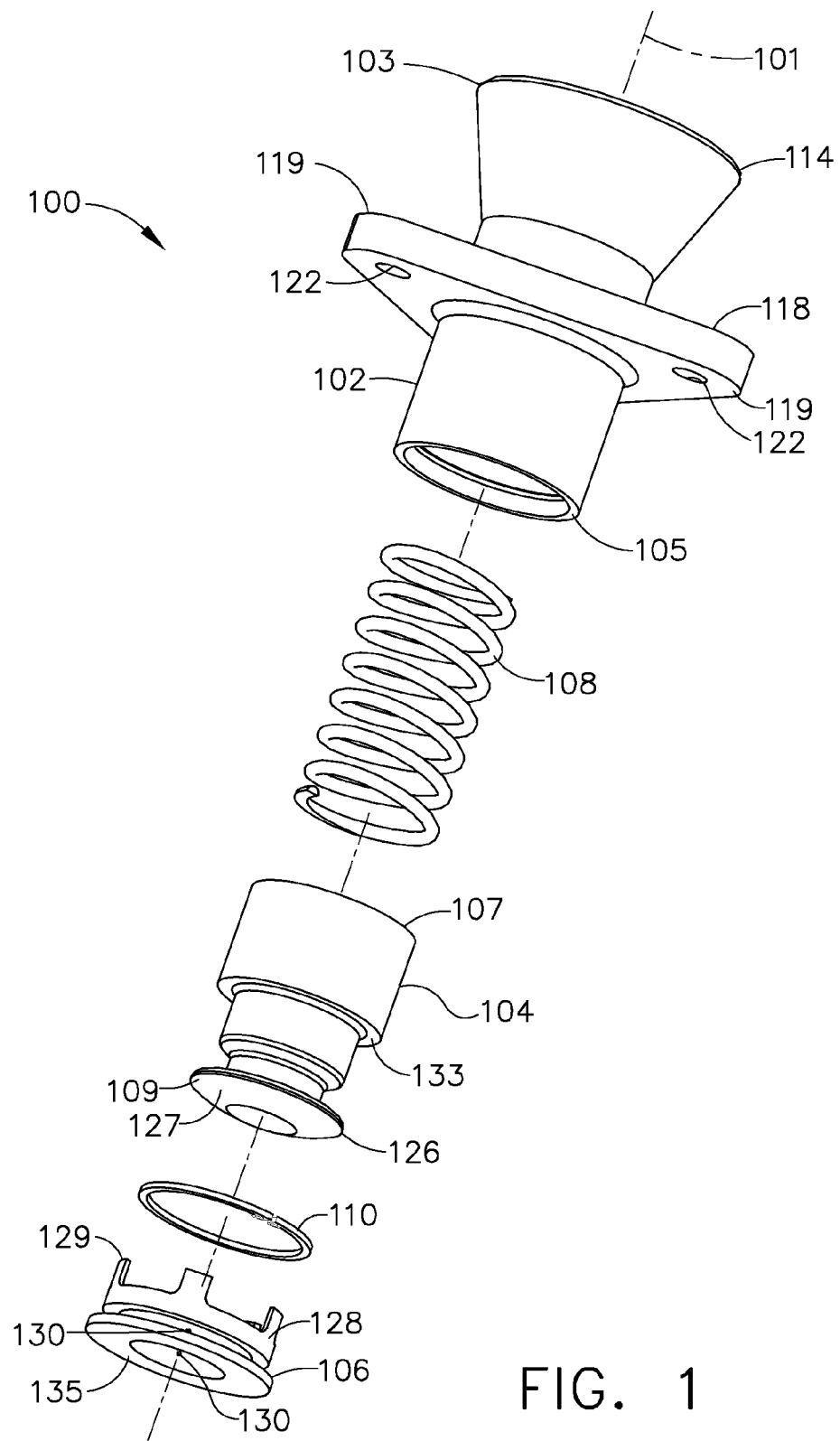
FIG. 1 is a perspective exploded assembly view of an embodiment of an adaptor assembly of the present invention.
Figure 2:
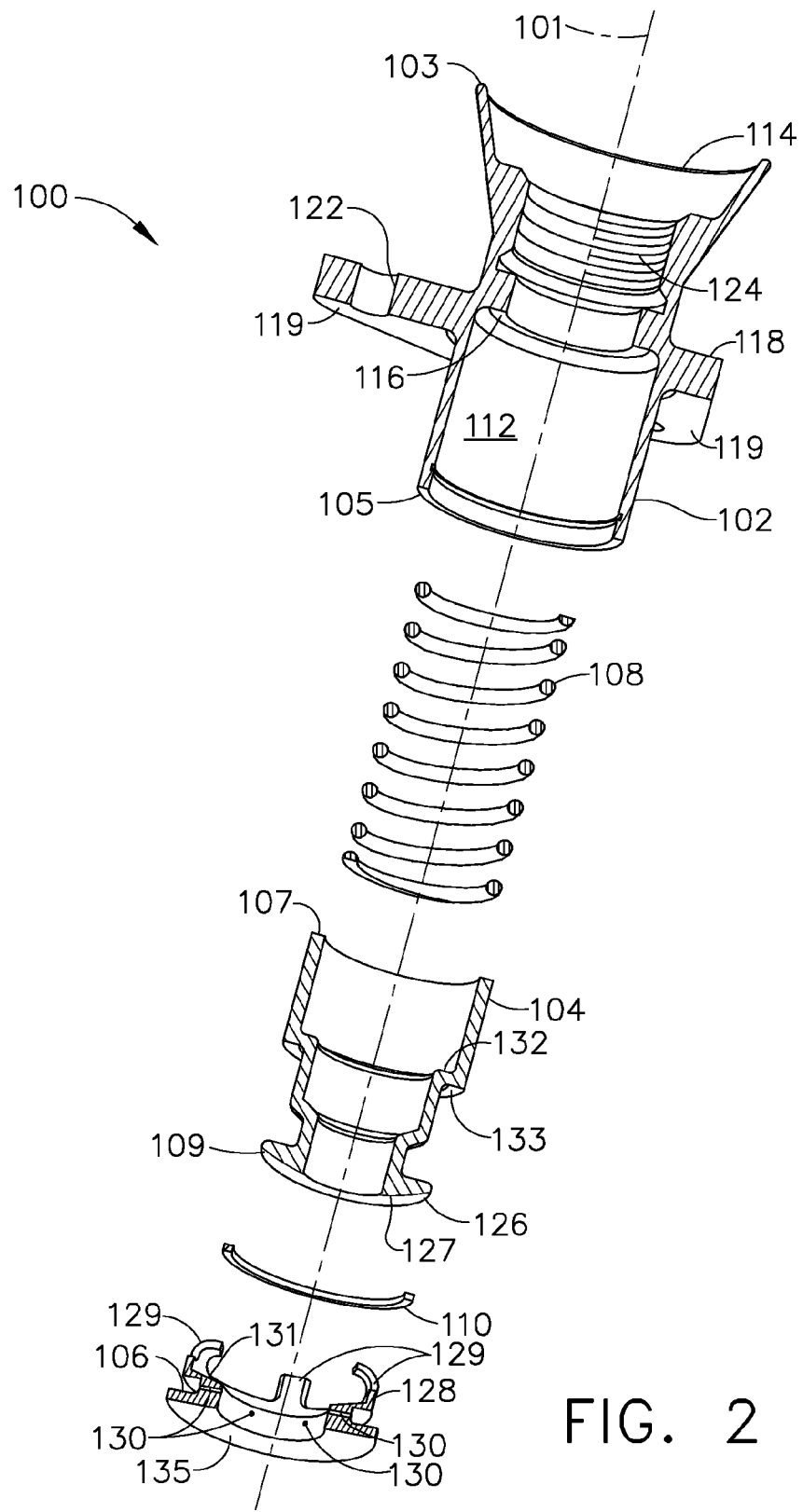
FIG. 2 is a cross-sectional exploded assembly view of the embodiment of FIG. 1.
Figure 3:
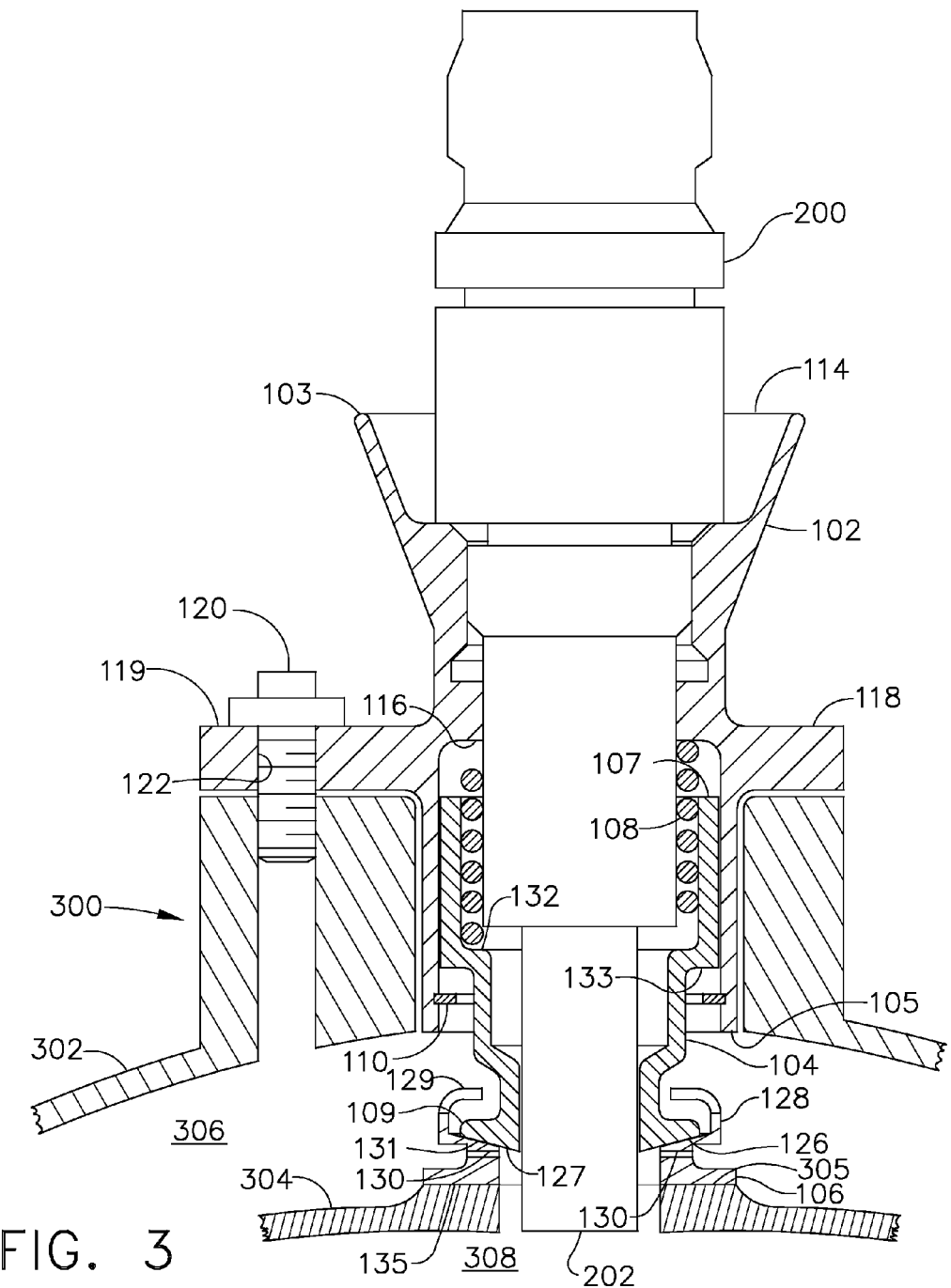
FIG. 3 is an illustration of an adaptor assembly that is removably mounted within a gas turbine engine via threaded fasteners.
Figure 4:
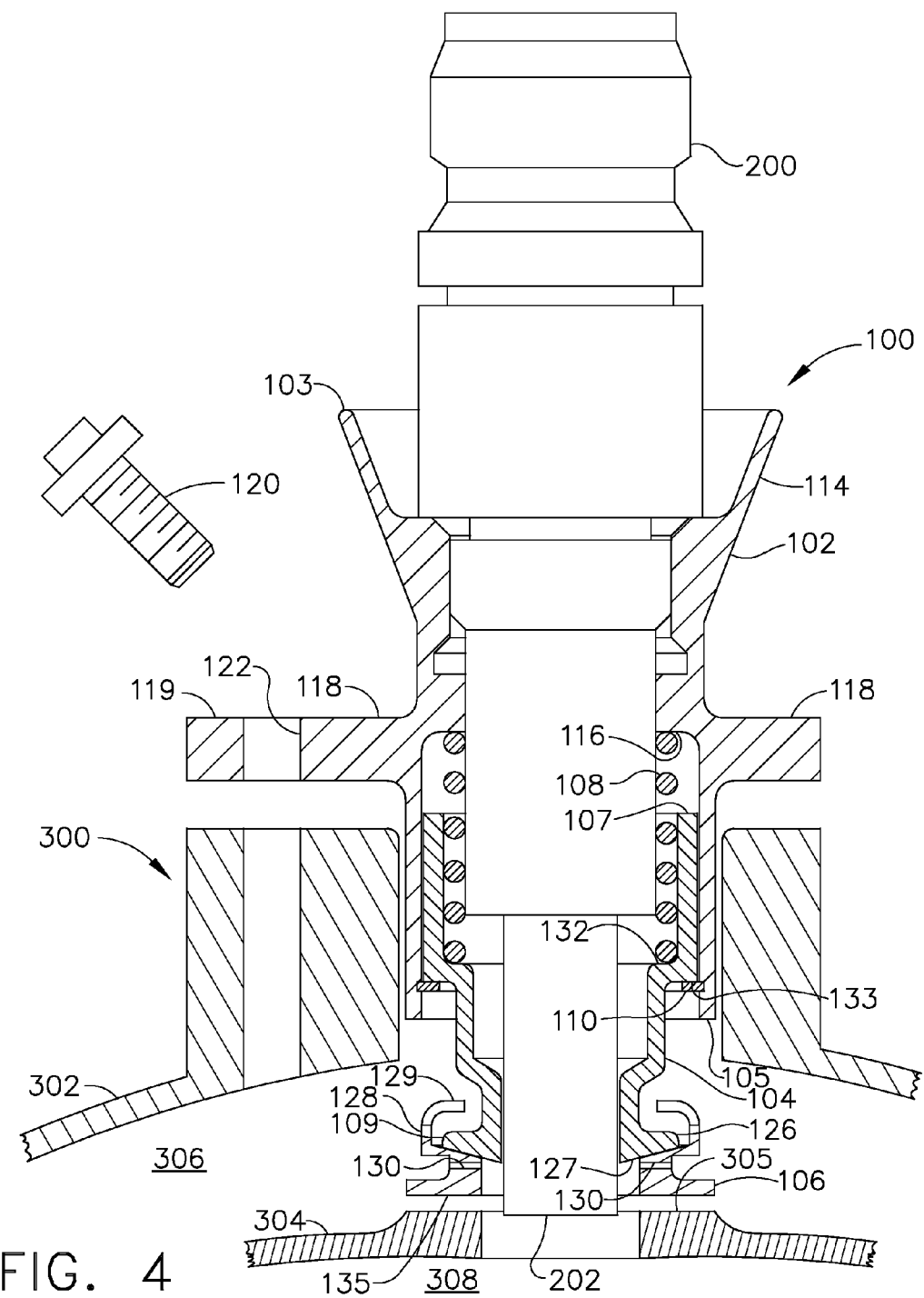
FIG. 4 depicts the adaptor assembly of FIG. 3 in an unmounted state.

Referring now to FIGS. 3 and 4, an adaptor assembly 100 for mounting a removable component 200 to a combustor case of a gas turbine engine is provided. The adaptor assembly 100 may be mounted to a combustor assembly 300, and preferably on a combustor case 302. A combustor liner 304 may be provided within the combustor case 302, with a bypass flow path 306 disposed therebetween. A combustion chamber 308 is preferably contained within the combustor liner 304. It is appreciated that the adaptor assembly 100 may be used for a variety of removable components, such as, for example, an igniter, a pressure sensor, a U.V. detector, a dynamic average pressure sensor, or any other active or passive component. For simplicity, the present embodiments of the adaptor assembly will be explained as used with an igniter 200 as used in a gas turbine engine.

With reference to FIGS. 1-4, one embodiment of an adaptor assembly 100 is provided with an igniter housing 102, a guide sleeve 104, a ferrule seal 106, a spring 108, and a retainer 110. The housing 102 at least partially houses the guide sleeve 104 and spring 108. The retainer 110 is mounted within the housing 102 to thereby capture the guide sleeve 104 and spring 108 and the ferrule seal 106 mates with the guide sleeve 104. Because of the high temperatures of a gas turbine engine that the adaptor assembly is employed, all components are preferably made of a high strength and high temperature tolerant material.

The housing 102 is provided with a radially distal first end 103 and an opposed radially proximal second end 105 with an opening 112 extending therethrough along an adaptor assembly longitudinal axis 101. The housing 102 may be generally cylindrical and provided with a conical entrance 114 through the opening 112 at the housing radially distal first end 103. The housing 102 may further be provided with an internal shoulder 116 to provide a surface for the spring 108 to abut against. The housing 102 may also be provided with an external shoulder 118. The external shoulder 118 may further be provided with one or more lobes 119 and openings 122 therethrough to facilitate releasably mounting the adaptor assembly 100 to the combustor case 302 by, for example, threaded fasteners 120. The housing 102 may also be provided with an internal threaded section 124 to releasably mount the igniter 200 within the housing opening 112.

A guide sleeve 104 is provided with a radially distal first end 107 and an opposed radially proximal second end 109 and may be at least partially housed within the housing radially proximal second end 105. The guide sleeve 104 may be generally cylindrical and may be provided with a circumferential tang 126 at its radially proximal second end 109. The guide sleeve 104 may also be provided with a spherical or generally spherical end surface 127 at its radially proximal second end 109. The guide sleeve tang 126 mates with a circumferential tang 128 on a ferrule seal 106. The ferrule seal tang 128 may also be provided with one or more swage tabs 129 to secure the guide sleeve 104. The guide sleeve end surface 127 may mate with and abut against a corresponding spherical or generally spherical surface 131 on the ferrule seal 106. The ferrule seal 106 may also have a flat or generally flat surface 135 that may mate with and abut against a flat or generally flat surface 305 on the combustor liner 304. The ferrule seal 106 may also be provided with one or more holes 130 therethrough to provide cooling gasses to the igniter tip 202. This cooling effect helps to reduce corrosion and other damaging effects to the igniter tip 202 that the tip 202 may be subject to due to the environment in which it is employed. In turn, this may increase the service life of the igniter 200. The ferrule seal 106 may be provided with any number and size of holes 130 to achieve the desired cooling effect and still maintain a sufficient seal between the bypass flow path 306 and combustor chamber 308, and may preferably be provided with three to six equally spaced holes 130.

The guide sleeve 104 may further be provided with an internal shoulder 132. The shoulder may provide an abutment surface for the spring 108, such that the spring 108 is disposed between the housing internal shoulder 116 and the guide sleeve internal shoulder 132. The spring 108 may be at least partially housed by the guide sleeve 104 and may at least partially extend out of the guide sleeve radially distal first end 107. A retainer 110 may be disposed within the radially proximal second end 105 of the housing opening 112. The retainer 110 may be, for example, a split washer and may be provided with tabs to assist in assembly of the adaptor assembly 100. The guide sleeve 104 may be provided with an external shoulder 133 that may abut against the retainer 110 to capture the sleeve 104 within the housing 102. The guide sleeve may at least partially extend out of the housing 102 through the retainer 110.

Referring now to FIGS. 3 and 4, an assembled adaptor assembly 100 is shown in a releasably mounted state (FIG. 3) and an un-mounted state (FIG. 4) in relation to a combustor case 302.

Referring to FIG. 3, the adaptor assembly 100 is releasably mounted to the combustor case 302 via one or more threaded fasteners 120 through openings 122 in the housing shoulder lobes 119. This places the housing 102 in a fixed position, while allowing the spring 108 to abut against the housing internal shoulder 116 and the guide sleeve internal shoulder 132. The spring 108 biases the guide sleeve 104 out of the radially proximal end 105 of the housing 102 towards the combustor liner 304 to press the guide sleeve end surface 104 against the ferrule seal 106, which is then pressed against the combustor liner 304. This configuration allows the spring 108 to be housed within the housing 102 and guide sleeve 104 away from the combustion chamber 308. This keeps the spring 108 relatively cooler to thereby increase its service life. The guide sleeve 104 also protects the spring 108 and the igniter 200 or other removable components from any debris that may be flowing through the bypass flow path 306.

Referring now to FIG. 4, the adaptor assembly 100 is disengaged from the combustor case 302. With no fastener 120 to secure the housing 102 in place, the spring 108 is free to expand and push the guide sleeve 104 toward the radially proximal end 105 of the housing 102. The placement of the retainer 110 within the radially proximal end 105 of the housing opening 112 (see FIGS. 1 and 2) prevents the guide sleeve 104 and spring 108 from falling out of the housing 102. This allows the adaptor assembly 100 to be assembled entirely outside of a gas turbine engine and then be mounted on the combustor case 302 as a single unit.

To assemble the adaptor assembly 100, one would place the spring 108 and radially distal first end 107 of the guide sleeve 104 within the housing opening 112 at its radially proximal second end 105. One would then compress the spring 108 and slip the retainer 110 past the guide sleeve tang 126 and secure the retainer 110 within the second end 105 of the housing opening 112. The ferrule seal 106 and igniter 200 may be secured to the assembly at any convenient stage of assembly. This embodiment also allows for the igniter 200 to be replaced while the adaptor assembly 100 is mounted to the combustor case 302.

The foregoing written description of structures and methods has been presented for purposes of illustration. Examples are used to disclose the invention, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus comprising:
a housing, a guide sleeve with a generally spherical end surface, and a spring;
wherein said guide sleeve is at least partially housed within said housing, and at least partially extending through said housing;
wherein said spring is disposed to abut against said housing and said guide sleeve; and,
a ferrule seal mounted to said guide sleeve, said ferrule seal having a plurality of radially extending cooling apertures, said cooling apertures disposed above sealing surfaces which extend in a circumferential direction of said ferrule seal.

2. The apparatus of claim 1, wherein said guide sleeve with a generally spherical surface abuts against a generally spherical surface on said ferrule seal.

3. The apparatus of claim 1, further comprising:
a removable component mounted to said housing and passing through said housing and said guide sleeve.

4. The apparatus of claim 1, wherein said spring abuts against an internal surface of said housing and an internal surface of said guide sleeve.

5. The apparatus of claim 1, wherein said spring biases said housing and said guide sleeve away from one another.

6. An apparatus comprising:
a housing, a guide sleeve with a generally spherical end surface, a spring, and a retainer;
said housing having a wall extending beyond a shoulder of said guide sleeve;
said retainer positioned on an inner surface of said wall of said housing;
a ferrule seal mounted to said guide sleeve, said ferrule seal having a plurality of radially extending cooling apertures disposed above a sealing surface which extends in a circumferential direction of said ferrule seal;
wherein said guide sleeve is at least partially housed within said housing, and at least partially extending through said retainer; and
wherein said spring is at least partially housed within said guide sleeve, wherein said spring is disposed to bias said guide sleeve against said retainer and wherein said retainer provides a limit for movement of said guide sleeve relative to said housing.

7. The apparatus of claim 6, wherein said ferrule seal is provided with one or more openings therethrough.

8. The apparatus of claim 7, further comprising:
a removable component mounted to said housing;
wherein said ferrule seal at least partially houses an end of said removable component.

9. The apparatus of claim 6, wherein said spring abuts against an internal surface of said housing.

10. The apparatus of claim 6, wherein said housing is generally cylindrical.

11. An apparatus comprising:
a housing having a housing first end and an opposed housing second end, said housing having an opening therethrough extending through said housing first end and said housing second end, a retainer removably mounted within said housing second end;
a guide sleeve with a generally spherical end surface having a guide sleeve first end and an opposed guide sleeve second end; said guide sleeve having an opening therethrough extending through said guide sleeve first end and said guide sleeve second end; and
a spring;
wherein said guide sleeve is at least partially housed within said housing, and wherein said guide sleeve first end extends through said housing second end;
a ferrule seal having a plurality of radially extending cooling apertures mounted to said guide sleeve second end; and
wherein said spring is at least partially housed within said guide sleeve and at least partially extends through said guide sleeve first end;
a removable component extending through said housing and said guide sleeve, said removable component having an end which is substantially flush with a combustor liner;
said housing, said guide sleeve and said spring each being at least partially disposed within a combustor casing.

12. The apparatus of claim 11, wherein said ferrule seal abuts against a generally flat surface on said combustor liner.

13. The apparatus of claim 11, wherein said spring abuts against an internal surface of said housing.

14. The apparatus of claim 11, wherein an external surface of said guide sleeve abuts against said retainer and said guide sleeve extends through said retainer.

15. The apparatus of claim 11, wherein said housing and said guide sleeve are generally cylindrical.

\* \* \* \* \*